Nov. 10, 1970            A. A. MATTHIES            3,538,717
REFRIGERATION SYSTEM CONTROL ARRANGEMENT INCLUDING
HEAT MOTOR OPERATED EXPANSION VALVE
Filed Dec. 4, 1968

Inventor
Alan A. Matthies
By Joseph A. Hennigan
Attorney

United States Patent Office 3,538,717
Patented Nov. 10, 1970

3,538,717
REFRIGERATION SYSTEM CONTROL ARRANGEMENT INCLUDING HEAT MOTOR OPERATED EXPANSION VALVE
Alan A. Matthies, Milwaukee, Wis., assignor to Controls Company of America, Melrose Park, Ill., a corporation of Delaware
Filed Dec. 4, 1968, Ser. No. 781,227
Int. Cl. F25b 41/04
U.S. Cl. 62—212                    4 Claims

ABSTRACT OF THE DISCLOSURE

A heat motor operated expansion valve for a refrigeration system is controlled by a condition responsive member, a pressure switch, which is exposed to the system and controls on the basis of a sensed system condition. In one aspect, a pressure switch is connected to energize and de-energize the heat motor on the basis of system pressure in the system. In another aspect, two pressure switches are connected in series with each other and the heat motor, one of the pressure switches is selected to operate at a particular pressure level and the other at a lower pressure level. A thermistor exposed to and responsive to the condition of the refrigeration system is connected in parallel with the pressure switch set to operate at the lower level so that below the lower level the pressure switch shunts the thermistor but above the lower level the thermistor is connected in the heat motor control circuit and thereby controls expansion valve operation between the upper and lower pressure levels.

BACKGROUND OF INVENTION

Field of invention

This invention relates to control of refrigeration systems and, more particularly, to the control of expansion valves in a refrigeration system.

Description of prior art

Refrigeration system controls are known which sense the temperature or condition of the refrigerant and/or the evaporator coil, for example, and translate the sensed condition into mechanical motion of an expansion valve in the system. Charged bulbs have been used to sense temperature conditions and, on the basis of variations in the sensed condition, produce a pressure change on a diaphragm operator to achieve valve movement. Also, arrangements are known wherein the valve is controlled by an electrically energized heat motor which is also exposed to the condition of system flow. Valve control is achieved on the basis of heat transfer between the heat motor and its ambient, which ambient is in turn influenced directly or indirectly by the condition of system flow.

A co-pending application of Alan A. Matthies, Ser. No. 659,962, filed Aug. 11, 1967, entitled "Thermistor Controlled Refrigeration Expansion Valve," now Pat. 3,478,-534, and assigned to the assignee of this application, discloses and claims a heat motor operated valve which is controlled by an electric circuit element, a thermistor, the characteristics of which vary on the basis of a sensed system condition.

SUMMARY OF INVENTION

An object of this invention is to provide an improved and versatile control arrangement for a refrigeration system. For the achievement of these and other objects, this invention proposes an expansion valve controlled by an operator functioning on the basis of an electrical input. A condition responsive control is provided in circuit with the operator controlling on the basis of a sensed condition in the refrigeration system. In a more specific aspect, two such condition responsive controls are provided in the control circuit of the operator and exposed to the system condition, one establishes an upper level of operation and the other operates at a lower level. An electric circuit element is connected in the circuit of the operator with the two condition responsive controls, the circuit element being characterized by having electrical characteristics which vary in accordance with a sensed condition of the refrigeration system. The condition responsive control which operates at the lower level shunts the electric circuit element below the lower level but connects the circuit element in the control circuit above that level so that upper and lower levels are provided on system operation and between those levels system operation is controlled on the basis of the condition of refrigeration system as sensed by the electric circuit element.

DESCRIPTION OF PREFERRED EMBODIMENT

Figure 1:
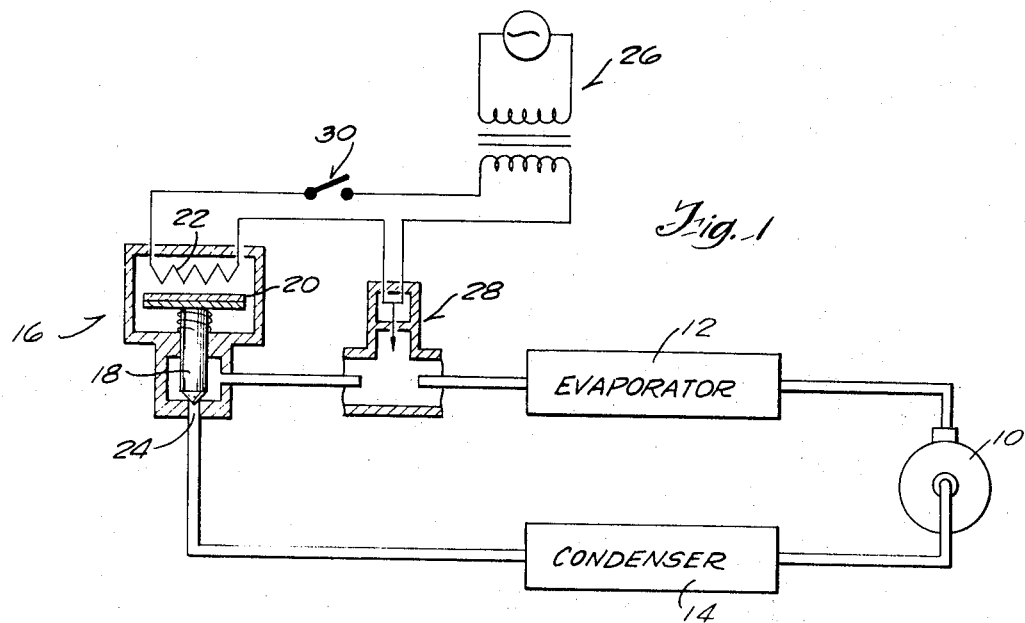
FIG. 1 is a schematic representation of a refrigeration system embodying this invention.

As illustrated in FIG. 1, the refrigeration system includes compressor 10, evaporator 12, condenser 14 and expansion valve 16 all connected by conduit.

Valve 16 is illustrated schematically and in the form of an electrically energized heat motor operated valve. The valve includes a valve member 18 connected in a conventional manner to bimetal 20, the bimetal in turn being in heat transfer relation with heater 22. The operative state of the bimetal is determined by heater 22 and valve member 18 moves with the bimetal and relative to orifice 24 to control flow between the valve inlet and outlet and, correspondingly, in the system. The heater is energized from source 26 and switch 30 can also be provided in the heater circuit to provide selective control.

This invention is concerned with controlling the operative state of the heat motor operator on the basis of the condition or state (pressure or temperature) of the refrigeration system. As illustrated in FIG. 1, a pressure switch 28 is connected in the heater circuit and is exposed to pressure within the system. The pressure switch may be selected to operate in response to a system condition and thereby establish a particular condition of operation. In FIG. 1, with one pressure switch it is set to respond to a preselected pressure condition by completing or opening the heater circuit to either drive expansion valve 16 open or allow the valve to move toward a closed position.

More particularly, pressure switch 28 is selected to close when system pressure falls below the preselected pressure condition and to open at or above that preselected pressure condition. In operation, pressure switch 28 controls at a particular, preselected pressure. The pressure switch is selected to close the heater circuit when the pressure falls below the preselected pressure to thereby energize the heater which bows bimetal 20 causing valve member 18 to move away from orifice 24 opening the valve to refrigerant flow. The increase in refrigerant flow raises system, or evaporator, pressure to again open the pressure switch and, correspondingly, the heater circuit which allows the bimetal to cool modulating the valve member toward a closed position. This will reduce the flow of refrigerant in the system, system pressure again falls until it reaches the preselected pressure condition whereupon the pressure switch recloses. This operation causes the system pressure to modulate about the preselected pressure condition and produces constant pressure control. In this system will tend to hover at the pressure setting of pressure switch 28. Also, a slow make and break pressure switch may be used. As illustrated in FIG. 1, pressure switch 28 is positioned so as to provide constant evaporator pressure but can be placed anywhere in the system.

This type of pressure control can be combined with superheat control by including an additional circuit element in the heater circuit which is intended to sense system condition and afford superheat control on the basis of the sensed condition. More specifically, FIG. 2 illustrates an alternative embodiment of this invention which affords both constant pressure and superheat control.

Figure 2:
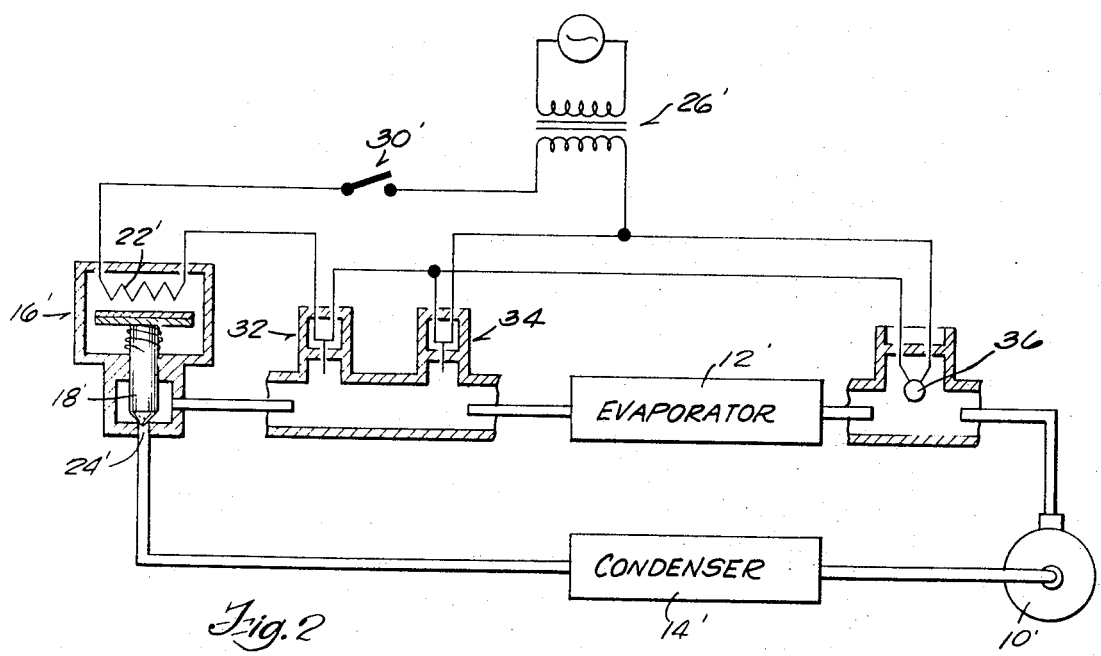
FIG. 2 is a schematic representation of an alternative embodiment of this invention.

In FIG. 2, two pressure switches 32 and 34 are connected in series with heater 22' and thermistor 36 is connected in the heater circuit in parallel with pressure switch 34. Pressure switch 32 can be viewed as a high pressure limit switch and 34 as a low pressure limit switch. Each is selected to operate at a preselected pressure setting, switch 32 intended to open above its pressure setting and thereby prevent a further increase in system pressure and switch 34 closing below its pressure setting, which is at a lower pressure level than that of switch 32.

Below the lower pressure limit of switch 34, the circuit through that switch is closed bypassing thermistor 36. Above that lower limit, switch 34 opens connecting the thermistor in series with heater 22' through switch 32 which is closed. The thermistor controls the input to heater 22' on the basis of the sensed condition in the system. The thermistor is suspended in the system conduit where it is subjected to self-generated heat, in the presence of refrigerant in a gaseous state the self-generated heat and hence temperature of the thermistor is relatively high. The thermistor has a negative coefficient of resistance and its resistance is thus reduced with a correspondingly high current in the heater which drives valve 16' open. Liquid refrigerant in the system, indicating an excess of refrigerant being supplied, will contact and rapidly cool the thermistor increasing its resistance and reducing current in the heater. This modulates the valve closed reducing the amount of refrigerant flow. Switch 32 still maintains an upper limit on the system pressure and relatively constant pressure operation about that upper limit.

The arrangement of FIG. 2 provides constant pressure control at an upper pressure level and between that upper pressure level and a lower pressure level, control is also on the basis of a sensed condition in the system with the thermistor arrangement being capable of providing 0° F. superheat control. Below the lower pressure level the heat motor of the valve is driven directly through both pressure switches and without the thermistor.

This arrangement provides operational upper and lower limits on the system pressure with superheat control between those limits. The construction and arrangement of the thermistor in the system and its operation are more completely set forth in the aforementioned patent of Alan A. Matthies. Reference is made to that application for a more complete description with regard to the construction, arrangement and operation of the thermistor should such a description become necessary.

Although this invention has been illustrated and described in connection with particular embodiments thereof, it will be apparent to those skilled in the art that various changes and modifications may be made therein without departing from the spirit of the invention or from the scope of the appended claims.

I claim:
1. A refrigeration system comprising, in combination a compressor, an evaporator, a condenser, and conduit means connecting said compressor, evaporator, and condenser,
valve means operable to control refrigerant flow in said system,
operator means connected to said valve means and, in response to an electrical signal, operating said valve means to determine refrigerant flow through said valve means and said system,
an electrical control circuit for said operator means,
condition responsive means comprising first and second pressure switches each exposed to system pressure, said first pressure switch operative to close below a preselected pressure and open above said preselected pressure and said second pressure switch operative to close below a second pressure lower than said preselected pressure and open above said second pressure,
and electrical circuit means in said control circuit in parallel with said second pressure switch characterized by having electric circuit characteristics which vary in accordance with variations in the temperature of said electrical circuit means and controlling said operator means in accordance with said electric circuit characteristics, said electrical circuit means connected in and exposed to the condition of said refrigeration system so that the temperature of said electrical circuit element is dependent upon the condition of the refrigeration system in the area of said electrical circuit element and the operative state of said valve means is varied in accordance with the sensed condition of said refrigeration system,
whereby said first pressure switch controls at said preselected pressure and between said preselected pressure and said second pressure said electrical circuit means controls said operator means.
2. The combination of claim 1 wherein
said operator means comprises heat motor means connected to said valve means and operative in response to an electrical input to vary the opening of and flow through said valve means,
and wherein said condition responsive means is connected to said heat motor means for controlling the electrical input to said heat motor means in response to system condition.
3. The combination of claim 1 including means supporting said electrical circuit means in the system conduit means exposed to the flowing refrigerant so that said electrical circuit means is subjected to self-generated heat and responds to the temperature and state of the flowing refrigerant.
4. The combination of claim 3 wherein said electrical circuit means comprises thermistor means.

References Cited
UNITED STATES PATENTS
3,324,674  6/1967  Finnegan _____ 62—224

MEYER PERLIN, Primary Examiner

U.S. Cl. X.R.
62—225